(12) United States Patent
Gu

(10) Patent No.: US 9,682,861 B2
(45) Date of Patent: Jun. 20, 2017

(54) ELECTRODE ACTIVE COMPOSITE MATERIALS AND METHODS OF MAKING THEREOF

(75) Inventor: Tao Gu, Carlsbad, CA (US)

(73) Assignee: MEECOTECH, INC., Endicott, NY (US)

( * ) Notice: Subject to any disclaimer, the term of this patent is extended or adjusted under 35 U.S.C. 154(b) by 426 days.

(21) Appl. No.: 12/771,465

(22) Filed: Apr. 30, 2010

(65) Prior Publication Data

US 2010/0279117 A1    Nov. 4, 2010

Related U.S. Application Data

(60) Provisional application No. 61/215,252, filed on May 4, 2009.

(51) Int. Cl.

| | |
|---|---|
| *B05D 7/00* | (2006.01) |
| *C01B 25/45* | (2006.01) |
| *C01B 25/37* | (2006.01) |
| *H01M 4/36* | (2006.01) |
| *H01M 4/58* | (2010.01) |
| *H01M 4/62* | (2006.01) |
| *H01M 4/136* | (2010.01) |

(52) U.S. Cl.
CPC .............. *C01B 25/45* (2013.01); *C01B 25/37* (2013.01); *H01M 4/366* (2013.01); *H01M 4/5825* (2013.01); *H01M 4/625* (2013.01); *H01M 4/136* (2013.01); *Y10T 428/2982* (2015.01)

(58) Field of Classification Search
CPC ............................... C01B 25/45; H01M 4/625
USPC ........................................................ 427/212
See application file for complete search history.

(56) References Cited

U.S. PATENT DOCUMENTS 4,180,482 A * 12/1979 Nishino et al. .................... 502/2
6,645,452 B1 * 11/2003 Barker et al. ................. 423/306
(Continued)

FOREIGN PATENT DOCUMENTS

| CN | 1648036 A | 8/2005 |
|---|---|---|
| CN | 101237036 A | 8/2008 |

(Continued)

OTHER PUBLICATIONS

Masquelier, Hydrated Iron Phosphates FePO4nH2O and Fe4(P2O7)3nH2O as 3 V Positive Electrodes in Rechargeable Lithium Batteries, Journal of the Electrochemical Society, 149 (8), (2002), p. A1037-A1044.*

(Continued)

*Primary Examiner* — Tabatha Penny
(74) *Attorney, Agent, or Firm* — Locke Lord LLP; Tim Tingkang Xia, Esq.

(57) ABSTRACT

In one aspect of the invention, a method of synthesizing a lithium metal phosphate composite usable for a lithium secondary battery includes the steps of forming a nanometer-size precursor comprising lithium source and metal phosphate nanoparticles having each nanoparticle at least partially coated a layer of carbon precursor, spray drying the nanometer-size precursor at a first desired temperature to form micron-size particles packed with the lithium metal phosphate precursor nanoparticles, and sintering the micron-size particles at a second desired temperature under an inert and/or reduction atmosphere to form a micron-size lithium metal phosphate composite.

14 Claims, 7 Drawing Sheets

(56) References Cited

U.S. PATENT DOCUMENTS

| | | | |
|---|---|---|---|
| 2002/0192137 A1* | 12/2002 | Chaloner-Gill et al. | 423/306 |
| 2004/0013941 A1* | 1/2004 | Kobayashi et al. | 429/231.1 |
| 2004/0126300 A1 | 7/2004 | Barker et al. | |
| 2006/0035150 A1* | 2/2006 | Audemer et al. | 429/221 |
| 2006/0127750 A1 | 6/2006 | Okada et al. | |
| 2006/0239883 A1* | 10/2006 | Kang et al. | 423/304 |
| 2009/0035204 A1* | 2/2009 | Xu et al. | 423/311 |
| 2009/0075083 A1 | 3/2009 | Bi et al. | |
| 2009/0081102 A1 | 3/2009 | Dai et al. | |

FOREIGN PATENT DOCUMENTS

| | | | | |
|---|---|---|---|---|
| CN | 101330141 A | 12/2008 | | |
| CN | 101393982 A | 3/2009 | | |
| WO | 2008067677 A1 | 6/2008 | | |
| WO | WO 2008/067677 | * | 6/2008 | C09C 3/08 |

OTHER PUBLICATIONS

S.T. Yang et al., Synthesis and characterization of LiFePO4 cathode material dispersed with nano-structured carbon, Electrochimica Acta, 2005, p. 166-171, vol. 51.

A. K. Padhi et al, Phospho-olivines as positive-electrode materials for rechargeable lithium batterie, Journal of the Electrochemical Society 1997, 144, (4), 1188-1194.

A. K. Padhi et al., Effect of structure on the Fe3+/Fe2+ redox couple in iron phosphates, Journal of the Electrochemical Society, 1997, 144, (5), 1809-1613.

A. Yamada et al. Optmzed LiFePO4 for lithium batery cathodes. Journal of the Eectrochemical Society, 2001, 148, (3), A224-A229.

Anna S. Andersson et at., Lithium extraction/insertion in LiFePO4: an X-ray diffraction and Mossbauer spectroscopy study, Solid State Ionics, 2000, 130, (1-2): 41-52.

Anna S. Andersson et al., Thermal stability of LiFePO4-based cathodes: Electrochemical and Solid State Letters, 2000. 3, (2), 66-68.

Hyung-Sun Kim et al., Cycling performance of LiFePO4 cathode material for lithium secondary batteries, Journal of Power Sources, 2004, 132, (1-2), 235-239.

N. Kosova et al., On mechanochemical preparation of materials with enhanced characteristics for lithium batteries, Solid State Ionics, 2004, 172, (1-4), 181-184.

Jiajun Chen et al., Hydrothermal synthesis of cathode materials, Journal of Power Sources, 2007, 174, (2), 442-448.

R. Dominko et al., Porous olivine composites synthesized by sol-get technique, Journal of Power Sources, 2006, 153, (2), 274-280.

G. Arnold et al., Fine-particle lithium iron phosphate LiFePO4 synthesized by a new low-cost aqueous precipitation technique, Journal of Power Sources, 2003, 119-121, 247-251.

H. Huang et al., Approaching theoretical capacity of LiFePO4 at room temperature at high rates, Electrochemic and Solid State Letters, 2001, 4, (10), A170-A172.

N. Ravet et al., Eiectroactivity of natural and synthetic triphylite, Journal of Power Sources, 2001, 97-98, pp. 503-507.

Sung-Yoon Chung et al., Electronically conductive phospho-olivines as lithium storage electrodes, Nature Materials, 2002, 1, 123-128.

F. Croce et al., A novel concept for the synthesis of an improved LiFePO4 lithium battery cathode, Electrochemical and Solid State Letters, 2002, 5, (3), A47-A50.

P. Subramanya Herle et al., Nano-network electronic conduction in iron and nickel olivine phosphates, Nature Materials, 2004, 3, 147-152.

Pier Paolo Prosini et al., Long-term cyclability of nanostructured LiFePO4, Electrochimica Acta, 2003, 48, 4205-4211.

Seung-Taek Myung et al., Emulsion drying synthesis of olivine LiFePO4/C composite and its electrochemical properties as lithium intercalation material, Electrochimica Acta, 2004, 49, 4213-4222.

Kuei-Feng Hsu et al., Synthesis and characterization of nano-sized LiFePO4 cathode materials prepared by a citric acid-based sol-gel route, Journal of Materials Chemistry 2004, 14, 2690-2695.

Jaewon Lee et al., Synthesis of LiFePO4 micro and nanoparticies in supercritical water, Materials Letters, 2006, 60, 2105-2109.

B. Ellis et al., Nanostructured materials or lithium-ion batteries: Surface conductivity vs. bulk ion/electron transport, Faraday Discussions, 2007, 134. 119-141.

State Intellectual Property Office of the P.R.C., "Office Action and Search Report for Chinese Application No. 201080018434.4", China, Oct. 8, 2013.

* cited by examiner

ELECTRODE ACTIVE COMPOSITE MATERIALS AND METHODS OF MAKING THEREOF

CROSS-REFERENCE TO RELATED PATENT APPLICATION

This application claims priority to and the benefit of, pursuant to 35 U.S.C. §119(e), U.S. provisional patent application Ser. No. 61/215,252, filed May 4, 2009, entitled "ELECTRODE ACTIVE COMPOSITE MATERIALS WITH HIGH TAP DENSITY FOR LITHIUM ION BATTERIES, AND METHODS OF MAKING THEREOF," by Tao Gu, the disclosure of which is incorporated herein in their entirety by reference.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [10] represents the 10th reference cited in the reference list, namely, Arnold, G.; Garche, J.; Hemmer, R.; Strobele, S.; Vogler, C.; Wohlfahrt-Mehrens, A., Fine-particle lithium iron phosphate LiFePO$_4$ synthesized by a new low-cost aqueous precipitation technique. *Journal of Power Sources* 2003, 119, 247-251.

FIELD OF THE INVENTION

This invention relates to the preparation of materials useful as electrochemically active electrode materials in batteries. More specifically, the invention relates to a method for preparing lithium metal phosphate based composite useful for batteries, in particular for lithium ion batteries.

BACKGROUND OF THE INVENTION

Lithium ion batteries have ubiquitously existed in our daily life, and majority of these batteries are made of cobalt-based electrodes. As the cobalt-based lithium ion batteries get bigger they have thermal runaway problems, which prevent them from the applications to need large battery systems, such as electric vehicles (EV) or large energy storage systems. People have been searching for alternative electrodes which can be used to make large scale lithium ion batteries. Lithium iron phosphate with olivine structure (triphylite) has been identified as one of the most promising cathode materials for large lithium ion batteries since the report of Goodenough's group [1,2] and subsequent studies [2-5], owing to its excellent thermal stability.

The olivine-structured orthophosphate LiFePO$_4$ has an orthorhombic lattice with the space group Pnma and its unit cell parameters are a=10.3290 Å, b=6.0065 Å, and c=4.6908 Å [4]. LiFePO$_4$ can be reversibly delithiated to FePO$_4$. The unit cell parameters for FePO$_4$ phase are a=9.8142 Å, b=5.7932 Å, and c=4.7820 Å [4]. The volume change of unit cells between these two phases is around 6.58%, which is not a big concern for the battery manufacturing. The high stability of LiFePO$_4$ and the minimal changes in the unit cell parameters during the LiFePO$_4$/FePO$_4$ phase transition contribute a good cycle life of the resulting lithium ion batteries.

The theoretical capacity of LiFePO$_4$ cathodes is 170 mAh/g with a flat 3.45V charge-discharge potential vs Li/Li$^0$ owing to the Fe$^{3+}$/Fe$^{2+}$ redox couple. All the materials sources to form LiFePO$_4$ are abundant, non-toxic, and environmentally friendly. Overall, LiFePO$_4$-based lithium ion batteries are, indeed, attractive for large-scale applications.

Since the discovery of Goodenough's group, a numerous methods have been developed to synthesize LiFePO$_4$. These preparation methods include solid-state reactions [6], mechanochemical process [7], hydrothermal approaches [8], sol-gel methods [9], co-precipitation process [10], and many more others. Through these preparation methods various LiFePO$_4$ with different morphologies and electrochemical properties have been produced, and some of techniques have successfully been used in the industry-scale.

However, in order to utilize lithium iron phosphate as commercially viable cathode materials in lithium ion batteries, there are some hurdles need to be overcome. Pristine lithium iron phosphate compound has very poor electronic conductivity (on the order of $10^{-9}$ S/cm) and slow lithium ion diffusion in solid phase. The diffusion coefficients of lithium in LiFePO$_4$ and FePO$_4$ are $1.8 \times 10^{-14}$ and $2 \times 10^{-16}$ cm$^2$s$^{-1}$, respectively. There have been tremendous efforts to improve the conductivity of lithium iron phosphate during synthesis or afterward process. These efforts include reducing lithium iron phosphate particle size [11], coating lithium iron phosphate with carbon [12], doping with cations supervalent to Li$^{+[13]}$, and adding metal particles (such as copper or silver) [14]. Although there are several ways to improve conductivity of LiFePO$_4$, carbon coating has been dominant among all the methods in terms of effectiveness. Supervalent cation doping seems to be an attractive method. However, subsequent studies suggest that such an improvement in electronic conductivity is not from a true lattice doping effect but a result of carbon contamination from organic precursors and/or the formation of metallic-type conductive phases (such as Fe$_2$P) on particle surfaces under the highly reducing conditions used [15].

In terms of improvement of Lithium ion diffusion rate in the solid phases, reducing LiFePO$_4$ particle size has been a major approach, because reduced dimension of nanomaterials can boost efficient Lithium ion and electron transport by shortening the path length over which the Lithium ion and electron have to move. There are many ways to synthesize nanostructured LiFePO$_4$, such as producing amorphous LiFePO$_4$ from aqueous solutions of precursors and then obtaining nano-crystalline LiFePO$_4$ by heating amorphous LiFePO$_4$ in certain temperatures [16], emulsion drying synthesis of LiFePO$_4$/Carbon composite [17], sol-gel route for LiFePO$_4$/Carbon composite [18], and synthesis of LiFePO$_4$ nanoparticles in supercritical water [19].

Improvement of conductivity by carbon coating is obtained at the expense of reducing active materials ratio in the electrode and tends to lower the electrode overall capacity, especially the volumetric one. Decreasing the particle size of LiFePO$_4$ can also lower the volumetric energy density, caused by the decreasing tap density due to the high surface area of nanoparticles. Also, smaller particles need more carbon and binder to bind the particles together while forming an electrode. Therefore, controlling of carbon amount used in the electrode is critical, that is, to keep the balance between gaining enough electronic conductivity and not sacrificing the energy capacity of LiFePO$_4$ electrodes.

In order to make LiFePO$_4$ materials a viable electrode for lithium ion batteries, achieving a high electronic conductivity, fast Li$^+$ diffusion rate and high tap density will be the key. People have usually paid more attention on getting high conductivity and high Li$^+$ diffusion rate, but ignored the importance of tap density of materials, which is critical to achieve high volumetric energy density. Thus there is a need to develop a technology to produce an optimal electrode to meet all the needs of a lithium ion battery.

Therefore, a heretofore unaddressed need exists in the art to address the aforementioned deficiencies and inadequacies.

SUMMARY OF THE INVENTION

In one aspect, the present invention relates to a method of synthesizing a lithium iron phosphate composite usable for a lithium secondary battery. In one embodiment the method includes the step of providing a first solution and a second solution, where the first solution comprises ferric chloride hexahydrate dissolved in water, and the second solution comprises diammonium hydrogen phosphate and pyrrole dissolved in water.

Further, the method includes the steps of drop-wisely adding the first solution into the second solution with stirring to form a first mixture, stirring the first mixture for a first period of time and filtering and rinsing the stirred mixture with water to obtain solid substances.

In addition, the method includes the step of forming a composite of FePO$_4$ and carbon precursor from the solid substances. In one embodiment, the forming step comprises drying the solid substances at a second temperature for a fourth period of time and heating the dried solid substances to a third temperature under argon for a fifth period of time, and cooling it to the room temperature to form the composite of FePO$_4$ and carbon precursor.

Moreover, the method includes the steps of mixing an equivalent mole of a lithium compound and a sucrose with the FePO$_4$ composite to form a second mixture, ball-milling the second mixture for a second period of time to form a lithium iron phosphate precursor comprising nanometer-sized particles, and sintering the lithium iron phosphate precursor under an argon and hydrogen gas mixture at a first temperature for a third period of time to form a lithium iron phosphate composite.

In one embodiment, the lithium compound comprises Li$_2$CO$_3$. The lithium iron phosphate precursor is formed with Li:Fe:P=1:1:1 by mole ratio. The argon and hydrogen gas mixture comprises about 95% argon and about 5% hydrogen by volume.

In one embodiment, the first temperature, the second temperature and the third temperature are respectively in ranges of about 500-1200° C., about 20-150° C. and about 20-500° C. The first period of time, the second period of time, the third period of time, the fourth period of time and the fifth period of time are respectively in ranges of about 1-10 hours, about 18-30 hours, about 5-24 hours, about 6-18 hours and about 1-3 hours.

In one embodiment, the lithium metal phosphate composite includes a micron-size composite that is packed with a plurality of nanometer-sized lithium metal phosphate particles. The lithium metal phosphate composite has a tap density that is in a range of about 0.5 to 3 g/cm$^3$.

In another aspect, the present invention relates to a method of synthesizing a lithium metal phosphate composite usable for a lithium secondary battery. In one embodiment, the method includes the steps of forming a metal phosphate comprising nanoparticles, coating a layer of carbon precursor on at least a portion of the metal phosphate to form a nanometer-size precursor, adding a stoichiometric ratio of a lithium source in the nanometer-size precursor and mixing therewith to form a precursor mixture, spray drying the precursor mixture at a temperature ranged from about 20° C. to about 500° C. to form micron-size particles packed with the nanoparticles, and sintering the micron-size particles at a temperature ranged from about 500° C. to about 1200° C. under an inert and/or reduction atmosphere to form a micron-size lithium metal phosphate composite. The inert and/or reduction atmosphere comprises an argon and hydrogen gas mixture.

In one embodiment, the metal includes a transitional metal or a mixture of transition metals, where the transitional metal comprises Fe, Mn, V, Co, Ni, or a combination of them, and preferably comprises Fe. In another embodiment, the metal comprises optionally at least one non-transition metal.

The micron-size lithium metal phosphate composite comprises lithium metal phosphate nanoparticles. In one embodiment, the layer of carbon precursor is coated on at least a portion of each metal phosphate nanoparticle. Preferably, the layer of carbon precursor is coated through in situ oxidation polymerization during the formation of the nanometer-size metal phosphate nanoparticle. The layer of carbon precursor has a thickness in a range of about 0.5-100 nm. In one embodiment, the layer of carbon precursor comprises at least one of carbonaceous materials. In one embodiment, the percentage of carbon in the lithium metal phosphate composite is less than about 28.8%.

In one embodiment, the lithium metal phosphate nanoparticles self-organize to form the micron-size lithium metal phosphate composite, and preferably hierarchically self-organize to form the micron-size lithium metal phosphate composite.

In one embodiment, the micron-size lithium metal phosphate composite has a tap density that is in a range of about 0.5 to 3 g/cm$^3$.

In one embodiment, the nanometer-size precursor has a size in a range of about 1-500 nm. The micron-size lithium metal phosphate composite has a size in a range of about 1-100 μm, and a size distribution characterized with a median size that is in a range of about 1-100 μm, and a standard deviation that is no more than 50% of the median size. For example, if the composite has a median particle size of about 100 μm, or less than about 100 μm, the size range of particles of the composite is from about 50 μm to 150 μm, or less than about 50 μm to less than about 150 μm. Alternatively, the size distribution may be expressed as (the median size±the standard deviation). In one embodiment, the lithium metal phosphate nanoparticle has a size less than about 1.0 μm, and a size distribution characterized with a median size that is less than about 1.0 μm, and a standard deviation that is no more than 50% of the median size. Alternatively, the size distribution may be expressed as (the median size±the standard deviation).

In yet another aspect, the present invention relates to a method of synthesizing a lithium metal phosphate composite usable for a lithium secondary battery. In one embodiment, the method includes the steps of forming a nanometer-size precursor comprising metal phosphate nanoparticles having each nanoparticle at least partially coated a layer of carbon precursor, spray drying the nanometer-size precursor at a first desired temperature to form micron-size particles packed with the lithium source and metal phosphate nanoparticles, and sintering the micron-size particles at a second desired temperature under an inert and/or reduction atmosphere to form a micron-size lithium metal phosphate composite.

In one embodiment, the first desired temperature and the second temperature are respectively in ranges of about 20-500° C. and about 500-1200° C. The inert and/or reduction atmosphere comprises an argon and hydrogen gas mixture.

In one embodiment, the layer of carbon precursor comprises at least one of carbonaceous materials, and is coated through in situ oxidation polymerization during the formation of the nanometer-size metal phosphate nanoparticles.

In one embodiment, the metal includes a transitional metal or a mixture of transition metals, where the transitional metal comprises Fe, Mn, V, Co, Ni, or a combination of them, and preferably comprises Fe. In another embodiment, the metal comprises optionally at least one non-transition metal.

In a further aspect, the present invention relates to lithium metal phosphate composites synthesized according to the methods disclosed above.

In one embodiment, the lithium metal phosphate composite is characterized with a chemical formula, $LiMPO_4$, where M is a metal. The metal includes a transitional metal or a mixture of transition metals. In one embodiment, the transitional metal comprises Fe, Mn, V, Co, Ni, or a combination of them, and preferably comprises Fe. The metal may also include at least one non-transition metal.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The following figures are presented for the purpose of illustration only, and are not intended to be limiting.

DETAILED DESCRIPTION OF THE INVENTION

Figure 1:
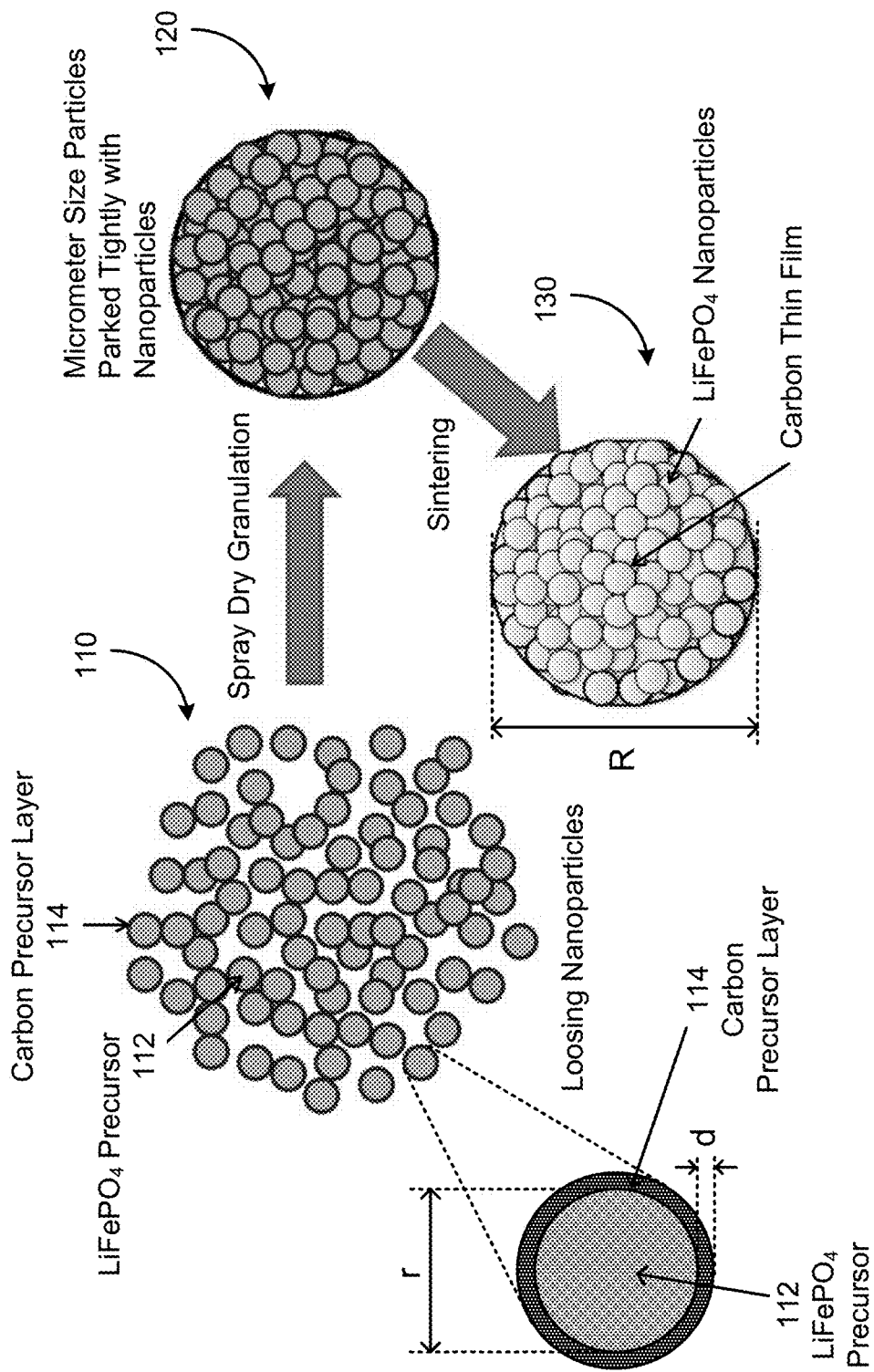
FIG. 1 shows a schematic illustration of synthesizing a micron-size composite comprising nanometer-size $LiFePO_4$ nanoparticles coated with a layer of carbon through spray-dried process according to one embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Referring to the drawings, like numbers indicate like components throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which has no influence on the scope of the invention.

The terms used in this specification generally have their ordinary meanings in the art, within the context of the invention, and in the specific context where each term is used.

Certain terms that are used to describe the invention are discussed below, or elsewhere in the specification, to provide additional guidance to the practitioner in describing the apparatus and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "scanning electron microscope" or "SEM" refers to a type of electron microscope that images the sample surface by scanning it with a high-energy beam of electrons in a raster scan pattern. The electrons interact with the atoms that make up the sample producing signals that contain information about the sample's surface topography, composition and other properties such as electrical conductivity.

As used herein, the term "X-ray diffraction" or "XRD" refers to a method of determining the arrangement of atoms within a crystal, in which a beam of X-rays strikes a crystal and diffracts into many specific directions. From the angles and intensities of these diffracted beams, a crystallographer can produce a three-dimensional picture of the density of electrons within the crystal. From this electron density, the mean positions of the atoms in the crystal can be determined, as well as their chemical bonds, their disorder and various other information.

As used herein, terms "nanoscopic," "nanometer-size," "nanometer," the "nano-" prefix, and the like generally refers to elements or articles having widths or diameters of less than about 1 μm. In all embodiments, specified widths can be smallest width (i.e., a width as specified where, at that location, the article can have a larger width in a different dimension), or largest width (i.e., where, at that location, the article's width is no wider than as specified, but can have a length that is greater).

As used herein, "reduction atmosphere", or "reducing atmosphere" is referred to an atmospheric condition in which oxidation is prevented by removal of oxygen and other oxidizing gases or vapors.

As used herein, the term "size" refers to the maximally spatial dimension of a particle, composite or article. For a spherical shape of the particle, composite or article, the size refers to its diameter. Otherwise, it refers to the maximal vertex distance of the particle, composite or article.

As used herein, the terms "comprising," "including," "having," "containing," "involving," and the like are to be understood to be open-ended, i.e., to mean including but not limited to.

OVERVIEW OF THE INVENTION

Three fundamental requirements for a high performance cathode of lithium ion batteries are: high electronic conductivity, high ionic conductivity, and high packing density (or high tap density). The conductivity of intrinsic lithium metal phosphate compounds is very low, and therefore, various approaches have been exercised to improve the conductivity of cathodes comprising lithium metal compounds. Adding carbon into the system has been the most dominant approach among all conventional methods. The lithium ion diffusion rate in the lithium metal phosphate solid phase is also low, and reducing dimension of lithium metal phosphate particles is the only efficient way to shorten the diffusion path and boost lithium ion transport during electrochemical cycling. Increasing packing density is very advantageous to obtain a high volumetric energy density with the electrode materials. However, increasing packing density has been surprisingly ignored by many electrode materials suppliers and research community.

One aspect of the present invention provides methods for preparing a uniform spherical composite comprising lithium metal phosphates and/or lithium mixed metal phosphates coated fully and/or partially with a layer of carbon. The composite leads to a high tap density due to the spherical shape. In embodiments, the tap density range of the composite is from 0.5 to 3.0 $g/cm^3$, or from 1.0 to 1.9 $g/cm^3$, or from 1.1 to 1.8 $g/cm^3$, or from 1.2 to 1.7 $g/cm^3$, or from 1.3 to 1.6 $g/cm^3$, or from 1.4 to 1.6 $g/cm^3$, or from 1.5 to 1.6 $g/cm^3$.

The composite is usable as an electrode material, preferably a cathode material, for lithium ion batteries, and/or as an ion storage material. The lithium metal phosphate composite comprises $LiMPO_4$, where M is a metal. The metal is a transition metal including one of Fe, Mn, V, Co and Ni, or a mixture of transition metals. Preferably, the metal comprises Fe. Additionally, the metal is optionally at least one non-transition metal or mixtures thereof.

The rate capabilities of the lithium metal phosphate such as $LiFePO_4$ are limited mainly by low electronic conductivity and low $Li^+$ transport rate in large $LiFePO_4$ particles. Reducing the transport path length of both electrons and $Li^+$ by reducing lithium metal phosphate particles has been the strategies to enhance rate performance of lithium metal phosphate electrodes. According to the present invention, hierarchical lithium metal phosphate composites are synthesized through a bottom-up approach. In one embodiment, metal phosphate nanoparticles with size between 2 and 15 nm are synthesized. These nanopartcles can self-organize to form large nanoparticles with size between 20 and 200 nm by tightly packing the metal phosphate nanoparticles. The metal phosphate nanoparticle size can be controlled by adjusting the reaction conditions including but not limited to temperature, concentration of reactants. In one embodiment, nanometer-size metal phosphates are stoichiometrically mixed with a lithium source in the solution to form a precursor mixture. The precursor mixture solution then forms micron-size lithium metal phosphate precursors through spray-drying granulation and its size can be controlled by adjusting parameters of spray-drying granulation.

The present invention also provides a method of forming nanometer-size precursors, such as nanometer-size metal phosphates, for producing composites of lithium metal phosphate later on. In one embodiment, the particle size of nanometer-size precursors can be controlled by adjusting synthesis parameters, including but not limited to reactant concentrations, temperatures, and so on.

The method also includes in situ forming a polymer coating on newly formed nanometer-size precursors. In one embodiment, a polymer coating is generated through in situ oxidation polymerization during the synthesis process of nanometer-size precursors. One or more elements with higher oxidation states, which also are the raw materials to form nanometer-size metal phosphate in the reactants, are used as initiators for oxidation polymerization. The micron-size spherical lithium metal phosphate composite comprises lithium metal phosphate nanoparticles coated fully and/or partially with a layer of carbon. In one embodiment, the lithium metal phosphate nanoparticles are intimately coated fully and/or partially with carbon, which means all surface and/or partial surface of the lithium metal phosphate nanoparticles are coated with a layer of carbon to form a core-shell structure. The thickness of the layer of carbon coated on lithium metal phosphate nanoparticles is from less 0.5 nm to 100 nm, preferable 0.5 nm to 50 nm, more preferable 0.5 nm to 10 nm, more preferably from 0.5 nm to 2 nm, more preferably from 0.5 nm to 1 nm.

Nanometer-size of lithium metal phosphates is advantageous for enhancing conductivity and ion diffusion. However, it is difficult to handle nanoparticles during production and processing due to small sizes. Spray-drying of granulation is an established industrial process for size enlargement of fine particles, and it has the capacity to produce uniformly micron-sized spherical particles. According to the present invention, the process of the spray-drying of granulation is used to pack all nanometer-size precursors together to form uniform micron-size spherical lithium metal phosphates. In one embodiment, nanometer-size precursors, dried metal phosphate coated fully and/or partially with a layer of carbon precursor, is mixed with other precursors in solution to form intimate precursor mixture comprising all the element sources with right stoichiometric ratio to form lithium metal phosphates. The mixture solution is then spray dried at a temperature ranged from about 20° C. to 500° C. to form micron-size particles with spherical shape. The micron-size particles are then through thermal treatment at a temperature ranged from 500° C. to 1200° C. under inert and/or reduction atmosphere for a time enough to form micron-size spherical lithium metal phosphate composites comprising lithium metal phosphate nanoparticles coated fully and/or partially with a layer of carbon.

Uniformity of the particle sizes is advantageous for electrochemical performance of lithium metal phosphate materials. According to the present invention, the lithium metal phosphate particles for the use of lithium ion batteries is very uniform, where the particle size distribution of the lithium metal phosphate is narrow.

In one embodiment, the size distribution of the lithium metal phosphate nanoparticles is less than about 1.0 μm±500 nm, or less than about 0.8 μm±400 nm, or less than about 0.5 μm±250 nm, or less than about 0.3 μm±150 nm, or less than about 0.1 μm±50 nm, or lest than about 80 nm±40 nm, or less than about 60 nm±30 nm, or less than about 40 nm±20 nm, or less than about 30 nm±15 nm, or less than about 20 nm±10 nm, or less than about 15 nm±7.5 nm, or less than about 10 nm±5 nm.

Since carbon is electrochemically inactive, the amount of the carbon added into the lithium metal phosphate should be as low as possible, as long as it can provide enough conductivity for the lithium metal phosphate and carbon composite. According to the present invention, the micron-size lithium metal phosphate composite comprising lithium metal phosphate nanoparticles at least partially coated with a layer of carbon. The thickness of the layer of carbon coated on lithium metal phosphate nanoparticles is from less 0.5 nm to 100 nm, preferable 0.5 nm to 50 nm, more preferable 0.5 nm to 10 nm, more preferably from 0.5 nm to 2 nm, more preferably from 0.5 nm to 1 nm. The percentage of carbon in the lithium metal phosphate composite is less than about 28.8%, or less than about 16.8%, or less than about 12.8%, or less than about 10.8%, or less than about 8.8%, or less than about 6.8%, or less than about 5.8%, or less than about 4.8%, or less than about 3.8%, or less than about 2.8%, or less than about 1.8%, or less than about 1.2%, or less than about 0.8%, or less than about 0.6%.

According to the present invention, nanometer-size precursors, metal phosphate coated fully and/or partially with a layer of carbon precursors are mixed in a solution. In one embodiment, the nanometer-size precursor is less than about 500 nm±50 nm, or less than about 400 nm±40 nm, or less than about 300 nm±30 nm, or less than about 200 nm±20 nm, or less than about 150 nm±15 nm, or less than about 100 nm±10 nm, or less than about 80 nm±8 nm, or less than about 60 nm±6 nm, or less than about 40 nm±4 nm, or less than about 30 nm±3 nm, or less than about 20 nm±2 nm, or less than about 15 nm±2 nm, or less than about 10 nm±2 nm, or less than about 8 nm±2 nm, or less than about 6 nm±2 nm, or less than about 5 nm±1.5 nm, or less than about 3 nm±1 nm.

According to the present invention, the carbon coated lithium metal phosphate nanoparticles form larger uniform micron-size spherical particles with close packing of the nanoparticles. These uniform micron-size spherical particles are called composites. In one embodiment, the diameter of the micron-size spherical lithium metal phosphate composite is less than about 100 μm, or less than about 80 μm, or less than about 60 μm, or less than about 40 μm, or less than about 20 μm, or less than about 15 μm, or less than about 10 μm, or less than about 8 μm, or less than about 6 μm, or less than about 3 μm, or less than about 2 μm, or less than about 1 μm. The particle size distribution of the lithium metal phosphate composite is narrow. In one embodiment, the size distribution of the micron-size lithium metal phosphate composite is characterized with a median size that is in a range of about 1-100 μm, and a standard deviation that is no more than 50% of the median size. Alternatively, the size distribution may be expressed as (the median size±the standard deviation), i.e., less than about 100.0 μm±50 μm, or less than about 80 μm±40 μm, or less than about 60 μm±30 μm, or less than about 40 μm±20 μm, or less than about 20 μm±10 μm, or less than about 15 μm±7.5 μm, or less than about 10 μm±5 μm, or less than about 8 μm±4 μm, or less than about 6 μm±3 μm, or less than about 3 μm±1.5 μm, or less than about 2 μm±1 μm, or less than about 1 μm±500 nm.

Referring the following examples, in one aspect of the present invention, a method of synthesizing a lithium iron phosphate composite usable for a lithium secondary battery includes the step of providing a first solution and a second solution, where the first solution comprises ferric chloride hexahydrate dissolved in water, and the second solution comprises diammonium hydrogen phosphate and pyrrole dissolved in water.

Further, the method includes the steps of drop-wisely adding the first solution into the second solution with stirring to form a first mixture, stirring the first mixture for a first period of time and filtering and rinsing the stirred mixture with water to obtain solid substances.

In addition, the method includes the step of forming a composite of $FePO_4$ and carbon precursor from the solid substances. In one embodiment, the forming step comprises drying the solid substances a second temperature for a fourth period of time and heating the dried solid substances to a third temperature under argon for a fifth period of time, and cooling it to the room temperature to form the composite of $FePO_4$ and carbon precursor.

Moreover, the method includes the steps of mixing an equivalent mole of a lithium compound and a sucrose with the $FePO_4$ composite to form a second mixture, ball-milling the second mixture for a second period of time to form a lithium iron phosphate precursor comprising nanometer-sized particles, and sintering the lithium iron phosphate precursor under an argon and hydrogen gas mixture at a first temperature for a third period of time to form a lithium iron phosphate composite.

In one embodiment, the lithium compound comprises $Li_2CO_3$. The lithium iron phosphate precursor is formed with Li:Fe:P=1:1:1 by mole ratio. The argon and hydrogen gas mixture comprises about 95% argon and about 5% hydrogen by volume.

In one embodiment, the first temperature, the second temperature and the third temperature are respectively in ranges of about 500-1200° C., about 20-150° C. and about 20-500° C. The first period of time, the second period of time, the third period of time, the fourth period of time and the fifth period of time are respectively in ranges of about 1-10 hours, about 18-30 hours, about 5-24 hours, about 6-18 hours and about 1-3 hours.

In one embodiment, the lithium metal phosphate composite includes a micron-size composite that is packed with a plurality of nanometer-sized lithium metal phosphate particles. The lithium metal phosphate composite has a tap density that is in a range of about 0.5 to 3 g/cm$^3$.

In another aspect of the present invention, a method of synthesizing a lithium metal phosphate composite usable for a lithium secondary battery includes the steps of forming a metal phosphate comprising nanoparticles, coating a layer of carbon precursor on at least a portion of the metal phosphate to form a nanometer-size precursor, adding a stoichiometric ratio of a lithium source in the nanometer-size precursor and mixing therewith to form a precursor mixture, spray drying the precursor mixture at a temperature ranged from about 20° C. to about 500° C. to form micron-size particles packed with the nanoparticles, and sintering the micron-size particles at a temperature ranged from about 500° C. to about 1200° C. under an inert and/or reduction atmosphere to form a micron-size lithium metal phosphate composite. The inert and/or reduction atmosphere comprises an argon and hydrogen gas mixture.

In one embodiment, the metal includes a transitional metal or a mixture of transition metals, where the transitional metal comprises Fe, Mn, V, Co, Ni, or a combination of them, and preferably comprises Fe. In another embodiment, the metal comprises optionally at least one non-transition metal.

The micron-size lithium metal phosphate composite comprises lithium metal phosphate nanoparticles. In one embodiment, the layer of carbon precursor is coated on at least a portion of each metal phosphate nanoparticle. Preferably, the layer of carbon precursor is coated through in situ oxidation polymerization during the formation of the nanometer-size metal phosphate nanoparticle. The layer of carbon precursor has a thickness in a range of about 0.5-100 nm. In one embodiment, the layer of carbon precursor comprises at least one of carbonaceous materials. In one embodiment, the percentage of carbon in the lithium metal phosphate composite is less than about 28.8%.

In one embodiment, the lithium metal phosphate nanoparticles self-organize to form the micron-size lithium metal phosphate composite, and preferably hierarchically self-organize to form the micron-size lithium metal phosphate composite.

Referring to FIG. 1, in one aspect of the present invention, a method of synthesizing a lithium metal phosphate composite 130 includes the steps of forming a nanometer-size precursor 110 comprising lithium metal phosphate precursor nanoparticles 112 having each nanoparticle 112 at least partially coated with a layer of carbon precursor 114, spray drying the nanometer-size precursor 110 at a first desired temperature to form micron-size particles 120 packed with the lithium metal phosphate precursor nanoparticles, and sintering the micron-size particles 120 at a second desired temperature under an inert and/or reduction atmosphere to form a micron-size lithium metal phosphate composite 130. The first desired temperature and the second temperature are respectively in ranges of about 20-500° C. and about 500-1200° C. The inert and/or reduction atmosphere comprises an argon and hydrogen gas mixture.

The metal includes a transitional metal or a mixture of transition metals, where the transitional metal comprises Fe, Mn, V, Co, Ni, or a combination of them, and preferably comprises Fe. In addition, the metal may also include at least one non-transition metal.

The layer of carbon precursor 114 is coated through in situ oxidation polymerization during the formation of the nanometer-size metal phosphate nanoparticles 112, and has a thickness indicated by d, which in a range of about 0.5-100 nm.

The lithium metal phosphate precursor nanoparticle 112 has a diameter indicated by r, which is less than about 1.0 μm. The size distribution of the lithium metal phosphate precursor nanoparticles is expressed as (the median size±the standard deviation), where the median size is less than about 1.0 μm, and the standard deviation is no more than 50% of the median size. For example, the size distribution of the lithium metal phosphate precursor nanoparticles is less than about 1.0 μm±500 nm, or less than about 0.8 μm±400 nm, or less than about 0.5 μm±250 nm, or less than about 0.3 μm±150 nm, or less than about 0.1 μm±50 nm, or lest than about 80 nm±40 nm, or less than about 60 nm±30 nm, or less than about 40 nm±20 nm, or less than about 30 nm±15 nm, or less than about 20 nm±10 nm, or less than about 15 nm±7.5 nm, or less than about 10 nm±5 nm.

The micron-size lithium metal phosphate composite 130 has a size/diameter indicated by R, which is in a range of about 1-100 μm. The size distribution of the micron-size lithium metal phosphate composite is expressed as (the median size±the standard deviation), where the median size is a range of about 1-100 μm, and the standard deviation is no more than 50% of the median size. For example, the size distribution of the lithium metal phosphate precursor nanoparticles is less than about 100.0 μm±50 μm, or less than about 80 μm±40 μm, or less than about 60 μm±30 μm, or less than about 40 μm±20 μm, or less than about 20 μm±10 μm, or less than about 15 μm±7.5 μm, or less than about 10 μm±5 μm, or less than about 8 μm±4 μm, or less than about 6 μm±3 μm, or less than about 3 μm±1.5 μm, or less than about 2 μm±1 μm, or less than about 1 μm±500 nm.

According to the present invention, the micron-size lithium metal phosphate composite has a high tap density that is in a range of about 0.5 to 3 g/cm$^3$.

These and other aspects of the present invention are further described below.

EXAMPLES AND IMPLEMENTATIONS OF THE INVENTION

Without intent to limit the scope of the invention, exemplary methods and their related results according to the embodiments of the present invention are given below. Note again that titles or subtitles may be used in the examples for convenience of a reader, which in no way should limit the scope of the invention. Moreover, certain theories are proposed and disclosed herein; however, in no way they, whether they are right or wrong, should limit the scope of the invention.

Example 1

Figure 2:
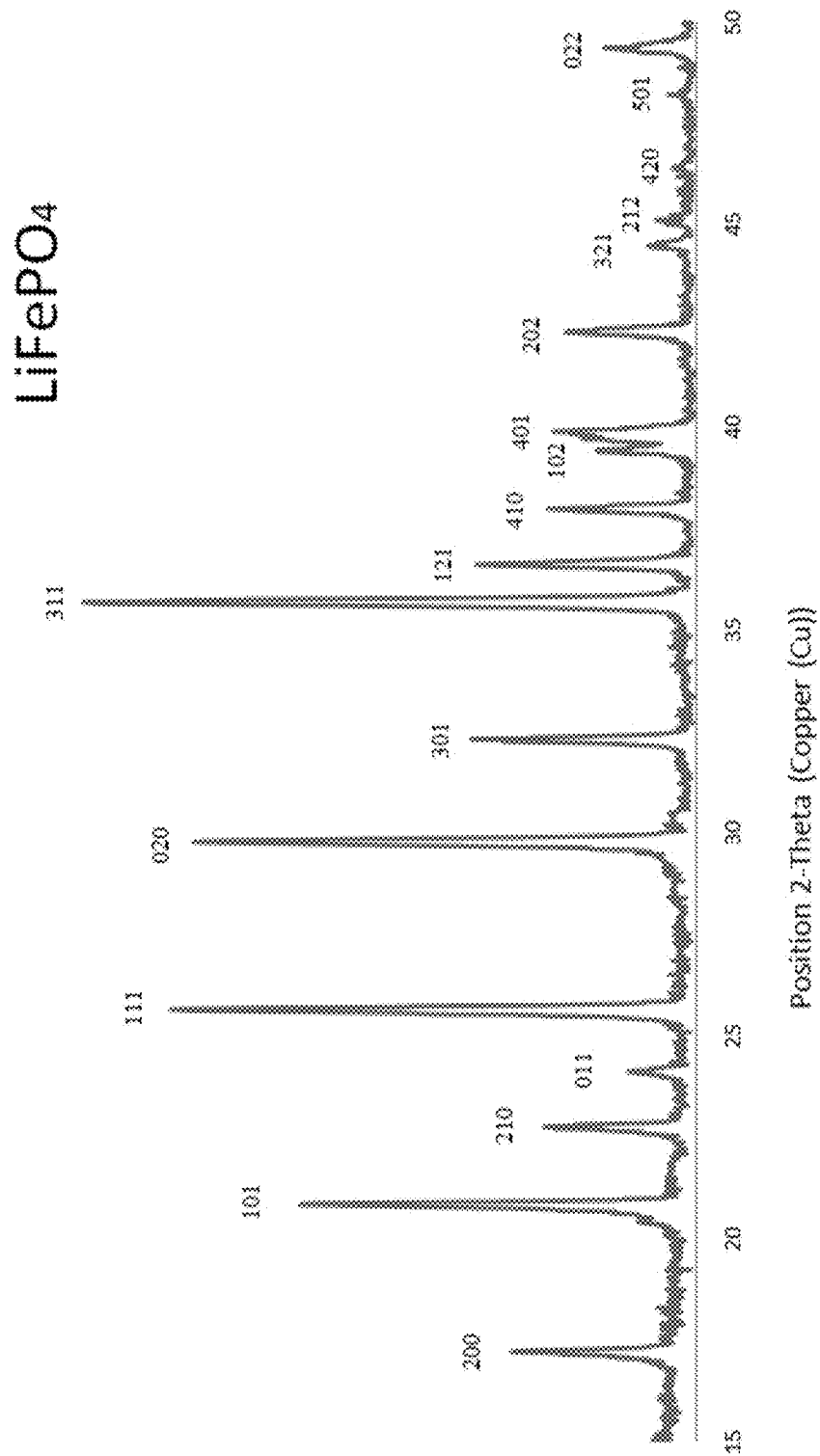
FIG. 2 shows an X-ray diffraction pattern of highly crystalline $LiFePO_4$ produced according to one embodiment of the present invention. There is no obvious impurity shown in the XRD pattern.
Figure 3:
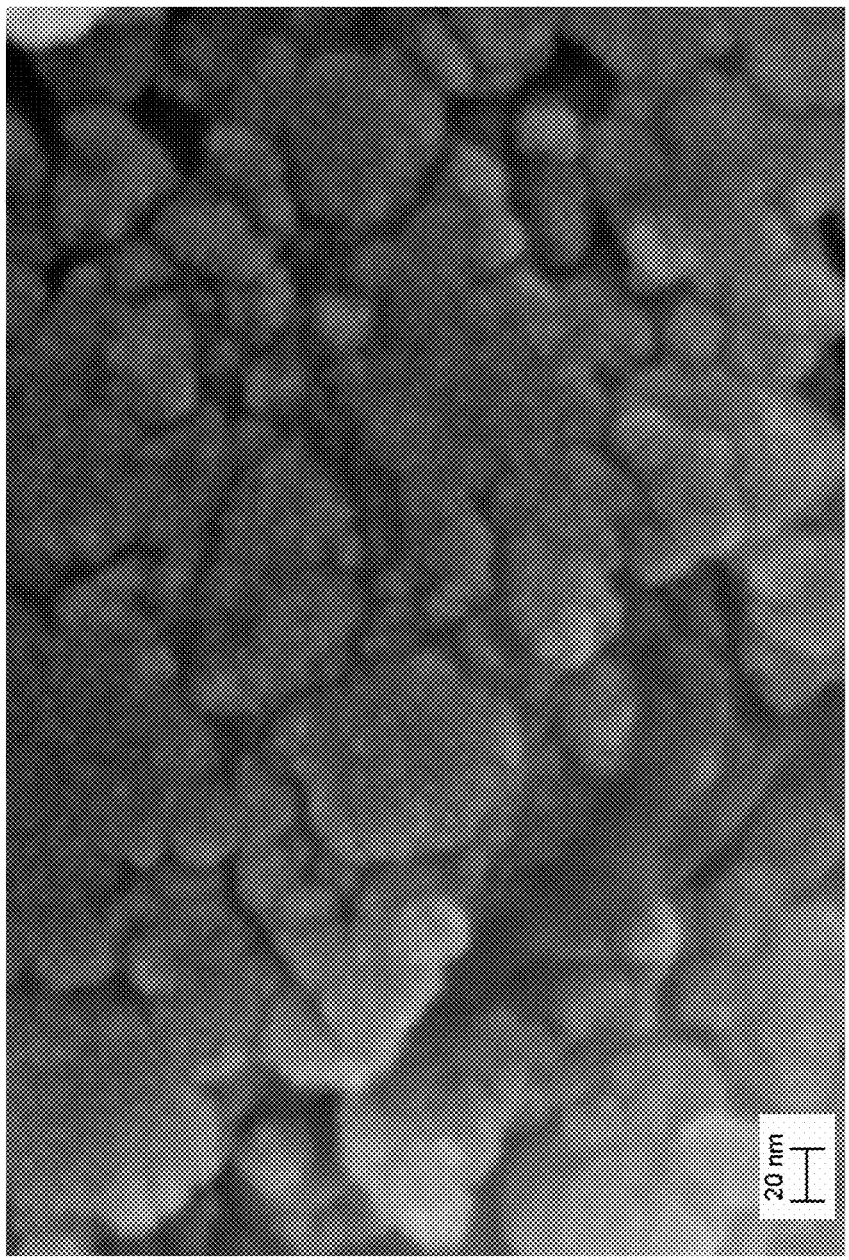
FIG. 3 shows a field emission scanning electron microscope (FE-SEM) image of a nanometer-size precursor of $LiFePO_4$. The precursor includes uniform about 5-6 nm particles with approximately close packing.
Figure 4:
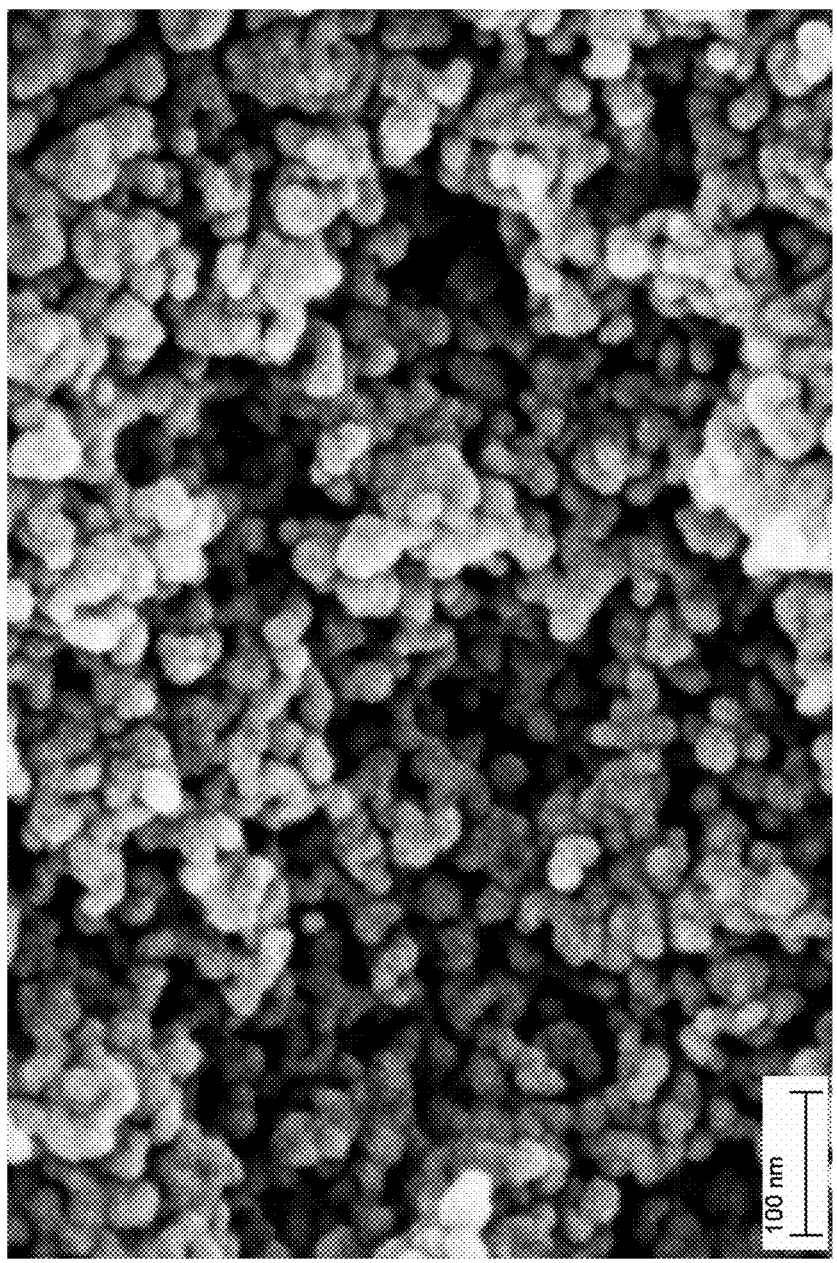
FIG. 4 shows an FE-SEM image of a well dispersed and uniform about 30-40 nm precursor comprising the nanometer-size precursor shown in FIG. 3. The precursor particles do not closely pack together, and instead, there are lots of voids among the precursor particles.
Figure 6:
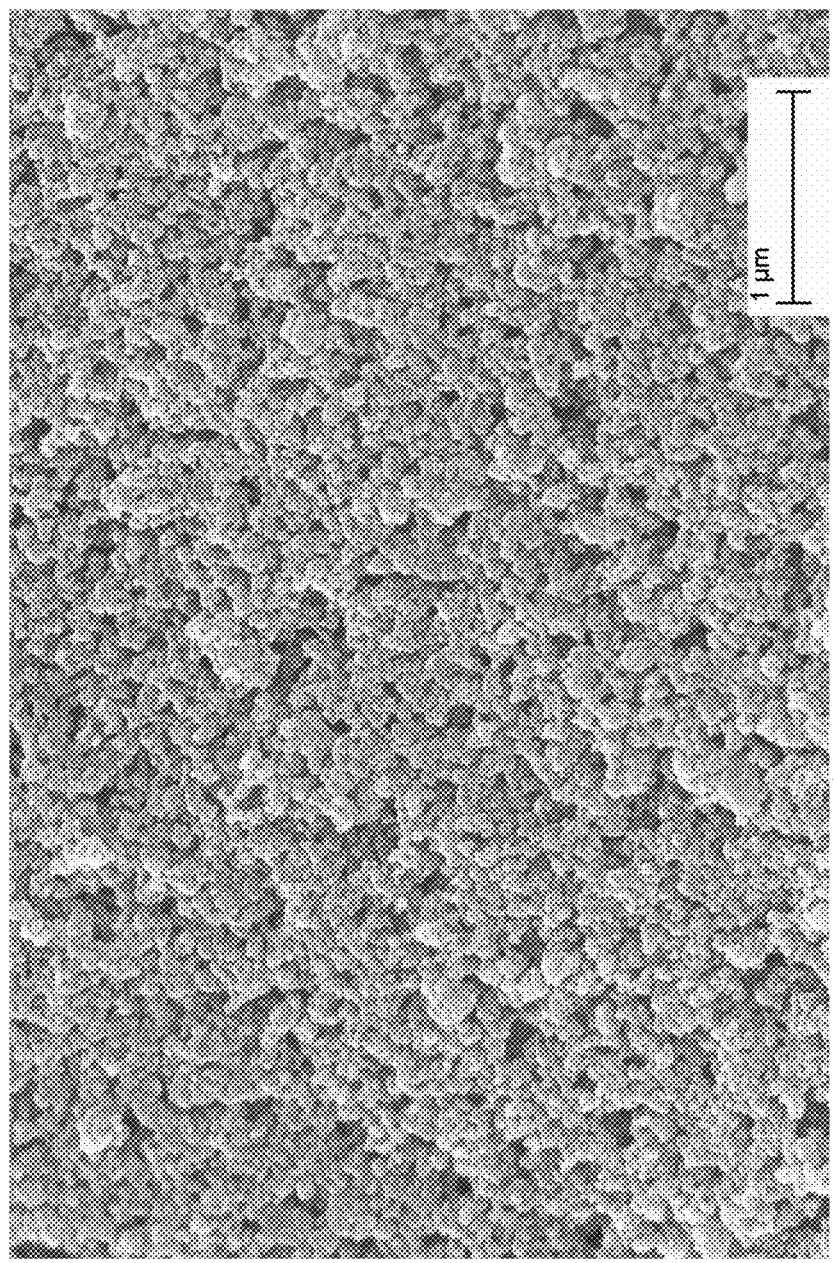
FIG. 6 shows an FE-SEM image of a sintered $LiFePO_4$, which is packed with a plurality of nanometer-sized $LiFePO_4$ particles and voids, according to one embodiment of the present invention.

Solution A1: about 108.12 gram of ferric chloride hexahydrate was dissolved in about 200 ml of water; Solution B1: about 52.8 gram of diammonium hydrogen phosphate and about 12 ml of pyrrole were dissolved in about 500 ml of water. Solution A1 was added drop-wise into Solution B1 with stirring. The resulting mixture was stirred for about four (4) hours after finishing adding Solution A1. The resulting mixture was filtered and thoroughly rinsed with water. The resulting solid material was then dried in an oven at about 104° C. for overnight, and the dry solid material was then heated to about 300° C. under argon for about 2 hours and then cooled to the room temperature. The resulting powder was the composite of $FePO_4$ and carbon precursor. The equivalent mole of a lithium compound, $Li_2CO_3$ and sucrose (about 15% of total solid weight) were mixed with the $FePO_4$ composite and ball milled for about 24 hours to form a lithium iron phosphate precursor (with Li:Fe:P=1:1:1). FIGS. 3 and 4 show the precursor includes nanometer-sized particles. The precursor was then sintered under argon and hydrogen gas mixture (about 95% Ar and about 5% $H_2$) at about 750° C. for about 10 hours. The XRD pattern of the sintered product is given in FIG. 2, which indicates a highly crystalline $LiFePO_4$ phase with an olivine structure. An SEM image of the sintered $LiFePO_4$ shown in FIG. 6 shows that the sintered $LiFePO_4$ is packed with a plurality of nanometer-sized $LiFePO_4$ particles and voids. The tap density of the sintered $LiFePO_4$ is about 1.03 $g/cm^{-3}$. The resulting $LiFePO_4$ material was used as a cathode material to form a coin cell for an electrochemical test, and the result after about 50 cycles indicated a discharge capacity of about 141 mAh/g.

Example 2

Solution A2: about 80.8 gram of Ferric nitrate nonahydrate was dissolved in about 200 ml of water; Solution B2: about 26.4 gram of diammonium hydrogen phosphate and about 4 ml of pyrrole were dissolved in about 400 ml of water. Solution A2 was added drop-wise into Solution B2 with stirring. The resulting mixture was stirred for about four (4) hours after finishing adding Solution A2. The resulting mixture was filtered and thoroughly rinsed with water. The resulting solid material was then dried in an oven at about 104° C. for overnight, and the dry solid material was then heated to about 300° C. under argon for about 2 hours and then cooled to the room temperature. The resulting powder was the composite of $FePO_4$ and carbon precursor. The equivalent mole of a lithium compound, $Li_2CO_3$ and sucrose (15% of total solid weight) were mixed with the $FePO_4$ composite and ball milled for about 24 hours to form a lithium iron phosphate precursor (with Li:Fe:P=1:1:1). The precursor was then sintered under argon and hydrogen gas mixture (about 95% Ar and about 5% $H_2$) at about 750° C. for about 10 hours. The XRD pattern of the sintered product is the same as the one shown in FIG. 2, which indicates a highly crystalline $LiFePO_4$ phase with an olivine structure. The tap density of the sintered $LiFePO_4$ is about 1.01 $g/cm^{-3}$. The resulting $LiFePO_4$ material was used as a cathode material to form a coin cell for electrochemical test, and the result after about 50 cycles indicated a discharge capacity of about 138 mAh/g.

Example 3

Figure 5:
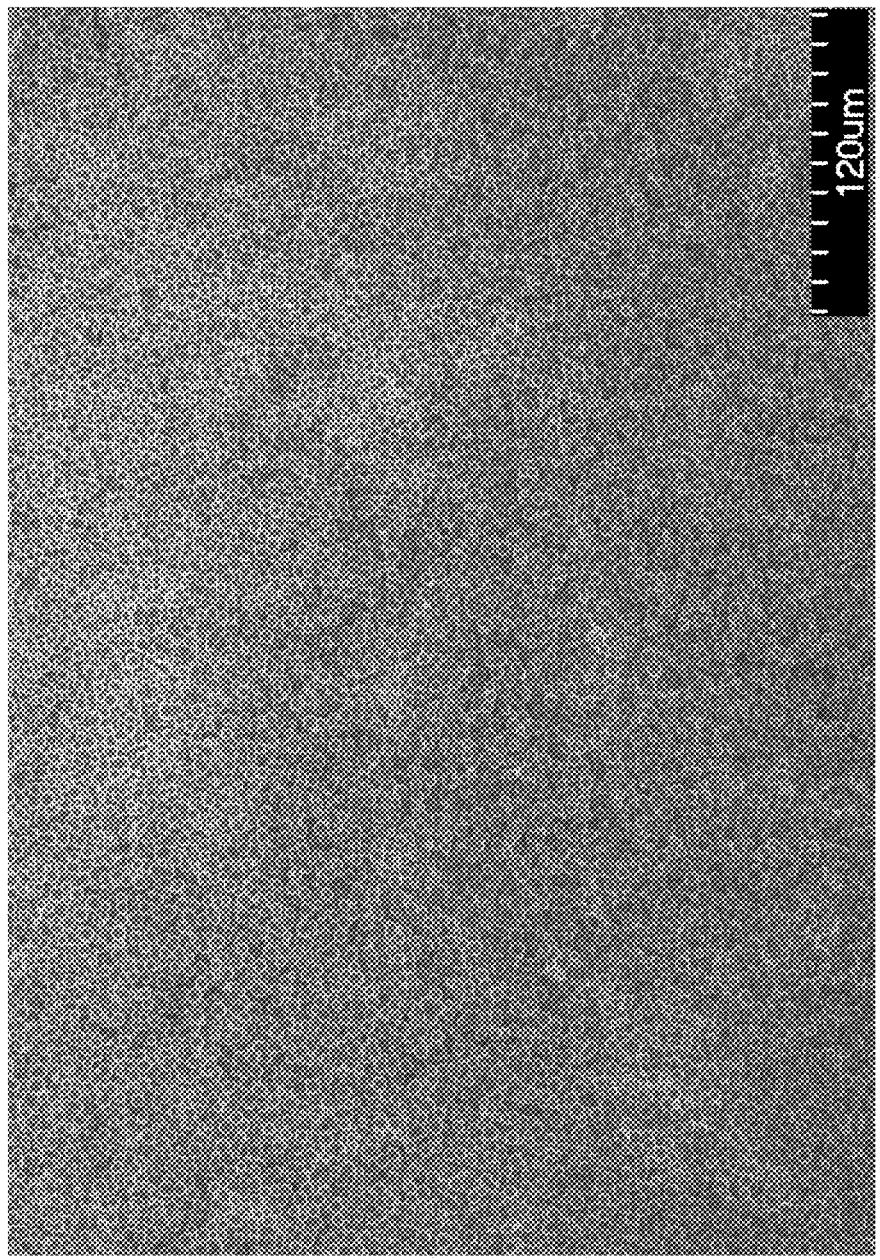
FIG. 5 shows an FE-SEM image of a well dispersed and uniform micron-size precursor comprising the nanometer-size precursor shown in FIG. 4. The precursor particles closely pack together, which leads to produce uniform $LiFePO_4$ with a high tap density.
Figure 7:
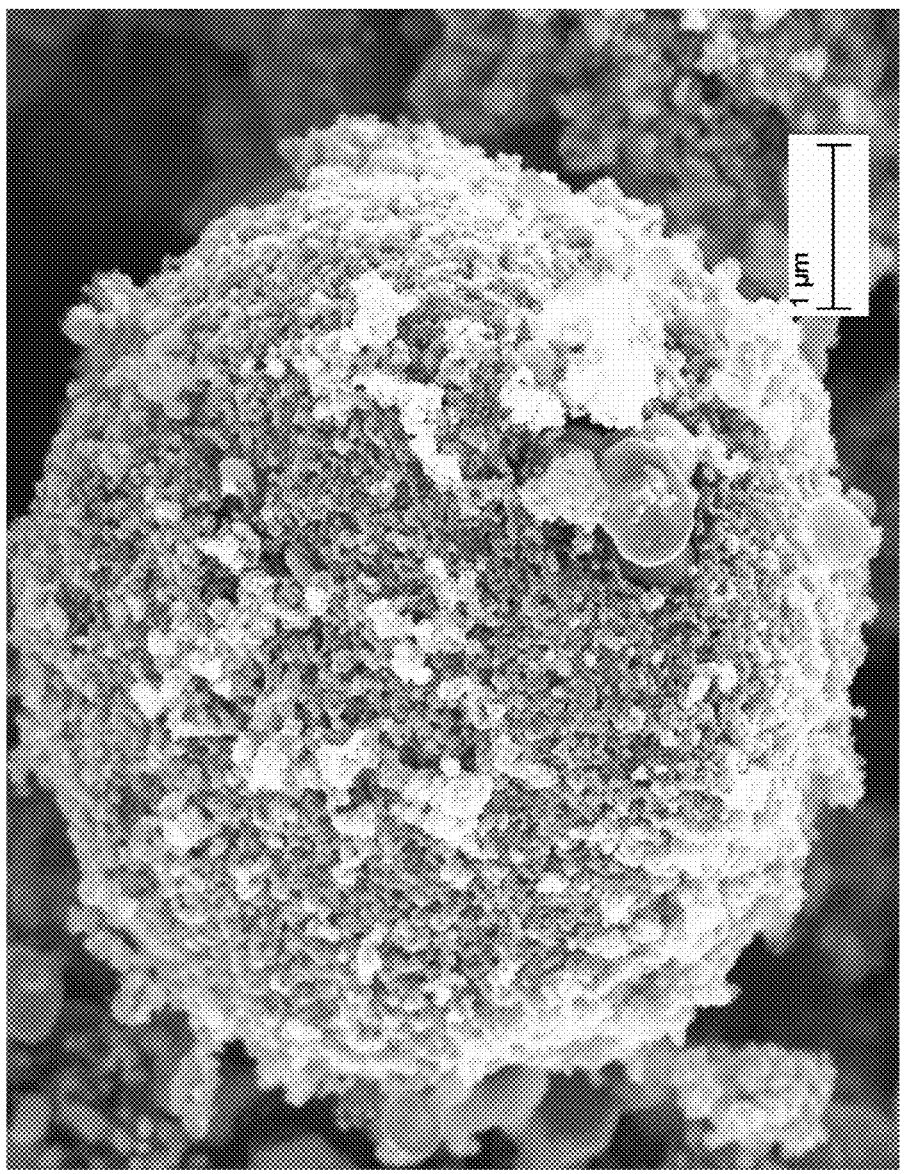
FIG. 7 shows an FE-SEM image of the spherical shape of a sintered $LiFePO_4$ particle closely packed with a plurality of nanometer-sized $LiFePO_4$ particles, according to one embodiment of the present invention.

Solution A3: about 2.7 kg of ferric chloride hexahydrate was dissolved in about 5 liter of water; Solution B3: about 1.32 kg of diammonium hydrogen phosphate and about 300 ml of pyrrole were dissolved in about 12 liter of water. Solution A3 was added drop-wise into Solution B3 with stirring in a reactor. The resulting mixture was stirred for about four (4) hours after finishing adding Solution A3. The resulting mixture was filtered and thoroughly rinsed with water. The resulting solid material was then dried in an oven at about 104° C. for overnight, and the dry solid material was then heated to about 300° C. under argon for about 2 hours and then cooled to the room temperature. The resulting powder was the composite of $FePO_4$ and carbon precursor. The equivalent mole of a lithium compound, $Li_2CO_3$ and sucrose (about 15% of total solid weight) were mixed with the $FePO_4$ composite in ethanol and ball-milled for about 24 hours to form a lithium iron phosphate precursor (with Li:Fe:P=1:1:1). The resulting slurry was spray-dried, the dried particles were collected and the morphological image of these dried precursor particles was showed in FIG. 5. The resulting dried precursor was then sintered under argon and hydrogen gas mixture (about 95% Ar and about 5% $H_2$) at about 750° C. for about 15 hours. The XRD pattern of the sintered product is as same as the one shown in FIG. 2, which indicates a highly crystalline $LiFePO_4$ phase with an olivine structure. An SEM image shown in FIG. 7 shows the spherical shape of the sintered $LiFePO_4$ particle closely packed with a number of nanometer-sized $LiFePO_4$ particles. The tap density of the sintered $LiFePO_4$ is about 1.33 $g/cm^{-3}$. The resulting $LiFePO_4$ material was used as a cathode material to form a coin cell for electrochemical test, and the result after about 50 cycles indicated a discharge capacity of about 145 mAh/g.

Briefly, the present invention, among other things, recites an electrode composite useful for lithium secondary batteries and methods of synthesizing same. The composite comprises lithium metal phosphate nanoparticles with each lithium metal phosphate nanoparticle fully or partially coated with a layer of carbon. The lithium metal phosphate nanoparticles self-organize to form a micron-size composite, preferably hierarchically self-organize to form a micron-size composite. The metal is a transition metal or a mixture of transition metals, preferably including at least one of Fe, Mn, V, Co and Ni. The metal may optionally include at least one non-transition metal or mixtures thereof. Accordingly, such an electrode composite has the high tap density of materials, which is critical to achieve high volumetric energy density.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. For example, multiple probes may be utilized at the same time to practice the present invention. Accordingly, the scope of the present invention is defined by the appended claims rather than the foregoing description and the exemplary embodiments described therein.

REFERENCE LIST

[1]. Padhi, A. K.; Nanjundaswamy, K. S.; Goodenough, J. B., Phospho-olivines as positive-electrode materials for rechargeable lithium batteries. *Journal of the Electrochemical Society* 1997, 144, (4), 1188-1194.

[2]. Padhi, A. K.; Nanjundaswamy, K. S.; Masquelier, C.; Okada, S.; Goodenough, J. B., Effect of structure on the Fe3+/Fe2+ redox couple in iron phosphates. *Journal of the Electrochemical Society* 1997, 144, (5), 1609-1613.

[3]. Yamada, A.; Chung, S. C.; Hinokuma, K., Optimized LiFePO$_4$ for lithium battery cathodes. *Journal of the Electrochemical Society* 2001, 148, (3), A224-A229.

[4]. Andersson, A. S.; Kalska, B.; Haggstrom, L.; Thomas, J. O., Lithium extraction/insertion in LiFePO$_4$: an X-ray diffraction and Mossbauer spectroscopy study. *Solid State Ionics* 2000, 130, (1-2), 41-52.

[5]. Andersson, A. S.; Thomas, J. O.; Kalska, B.; Haggstrom, L., Thermal stability of LiFePO$_4$-based cathodes. *Electrochemical and Solid State Letters* 2000, 3, (2), 66-68.

[6]. Kim, H. S.; Cho, B. W.; Cho, W. I., Cycling performance of LiFePO$_4$ cathode material for lithium secondary batteries. *Journal of Power Sources* 2004, 132, (1-2), 235-239.

[7]. Kosova, N.; Devyatkina, E., On mechanochemical preparation of materials with enhanced characteristics for lithium batteries. *Solid State Ionics* 2004, 172, (1-4), 181-184.

[8]. Chen, J.; Wang, S.; Whittingham, M. S., Hydrothermal synthesis of cathode materials. *Journal of Power Sources* 2007, 174, (2), 442-448.

[9]. Dominko, R.; Bele, M.; Gaberscek, M.; Remskar, M.; Hanzel, D.; Goupil, J. M.; Pejovnik, S.; Jamnik, J., Porous olivine composites synthesized by sol-gel technique. *Journal of Power Sources* 2006, 153, (2), 274-280.

[10]. Arnold, G.; Garche, J.; Hemmer, R.; Strobele, S.; Vogler, C.; Wohlfahrt-Mehrens, A., Fine-particle lithium iron phosphate LiFePO$_4$ synthesized by a new low-cost aqueous precipitation technique. *Journal of Power Sources* 2003, 119, 247-251.

[11]. Huang, H.; Yin, S. C.; Nazar, L. F., Approaching theoretical capacity of LiFePO$_4$ at room temperature at high rates. *Electrochemical and Solid State Letters* 2001, 4, (10), A170-A172.

[12]. Ravet, N.; Chouinard, Y.; Magnan, J. F.; Besner, S.; Gauthier, M.; Armand, M. In *Electroactivity of natural and synthetic triphylite*, 2001; 2001; pp 503-507.

[13]. Chung, S. Y.; Bloking, J. T.; Chiang, Y. M., Electronically conductive phospho-olivines as lithium storage electrodes. *Nature Materials* 2002, 1, (2), 123-128.

[14]. Croce, F.; Epifanio, A. D.; Hassoun, J.; Deptula, A.; Olczac, T.; Scrosati, B., A novel concept for the synthesis of an improved LiFePO$_4$ lithium battery cathode. *Electrochemical and Solid State Letters* 2002, 5, (3), A47-A50.

[15]. Herle, P. S.; Ellis, B.; Coombs, N.; Nazar, L. F., Nano-network electronic conduction in iron and nickel olivine phosphates. *Nature Materials* 2004, 3, (3), 147-152.

[16]. Prosini, P. P.; Carewska, M.; Scaccia, S.; Wisniewski, P.; Pasquali, M., Long-term cyclability of nanostructured LiFePO$_4$. *Electrochimica Acta* 2003, 48, (28), 4205-4211.

[17]. Myung, S. T.; Komaba, S.; Hirosaki, N.; Yashiro, H.; Kumagai, N., Emulsion drying synthesis of olivine LiFePO$_4$/C composite and its electrochemical properties as lithium intercalation material. *Electrochimica Acta* 2004, 49, (24), 4213-4222.

[18]. Hsu, K. F.; Tsay, S. Y.; Hwang, B. J., Synthesis and characterization of nano-sized LiFePO$_4$ cathode materials prepared by a citric acid-based sol-gel route. *Journal of Materials Chemistry* 2004, 14, (17), 2690-2695.

[19]. Lee, J.; Teja, A. S., Synthesis of LiFePO$_4$ micro and nanoparticles in supercritical water. *Materials Letters* 2006, 60, (17-18), 2105-2109.

[20]. Ellis, B.; Herle, P. S.; Rho, Y. H.; Nazar, L. F.; Dunlap, R.; Perry, L. K.; Ryan, D. H., Nanostructured materials for lithium-ion batteries: Surface conductivity vs. bulk ion/electron transport. *Faraday Discussions* 2007, 134, 119-141.

What is claimed is:

1. A method of synthesizing a lithium metal phosphate composite usable for a lithium secondary battery, comprising the steps of:
   forming a nanometer-size precursor from a mixture of a first solution having metal ions and a second solution having phosphate ions and a carbon source, wherein the metal of the metal ions is a transitional metal or a combination of transitional metals, and the nanometer-size precursor comprises metal phosphate nanoparticles, each metal phosphate nanoparticle being at least partially covered by a layer of carbon precursor, and wherein the layer of carbon precursor is coated through in situ oxidation polymerization during the formation of the nanometer-size metal phosphate nanoparticles;
   adding a stoichiometric ratio of a lithium source to the nanometer-size precursor and mixing therewith to form a precursor mixture comprising lithium metal phosphate nanoparticles;
   spray drying the precursor mixture at a temperature ranged from about 20° C. to about 500° C. to form micron-size particles, wherein the micron-size particles are packed with the lithium metal phosphate nanoparticles; and
   sintering the micron-size particles at a temperature ranged from about 500° C. to about 1200° C. under an inert and/or reduction atmosphere to form a micron-size spherical lithium metal phosphate composite, wherein the micron-size spherical lithium metal phosphate composite comprises the lithium metal phosphate nanoparticles, each lithium metal phosphate nanoparticle being coated at least partially with a layer of carbon.

2. The method of claim 1, wherein the inert and/or reduction atmosphere comprises an argon and hydrogen gas mixture.

3. The method of claim 1, wherein the metal is Fe, Mn, V, Co, Ni, or a combination of them.

4. The method of claim 1, wherein the layer of carbon-precursor is coated on at least a portion of each metal phosphate nanoparticle.

5. The method of claim 4, wherein the layer of carbon-precursor has a thickness in a range of about 0.5-100 nm.

6. The method of claim 4, wherein the layer of carbon-precursor comprises at least one of carbonaceous materials.

7. The method of claim 1, wherein the lithium metal phosphate nanoparticles self-organize to form the micron-size lithium metal phosphate composite.

8. The method of claim 1, wherein the micron-size lithium metal phosphate composite has a tap density that is in a range of about 0.5 to 3 g/cm$^3$.

9. The method of claim 1, wherein the percentage of carbon in the lithium metal phosphate composite is less than about 28.8%.

10. The method of claim 1, wherein the nanometer-size precursor has a size in a range of about 1-500 nm.

11. The method of claim 1, wherein the micron-size lithium metal phosphate composite has a size in a range of about 1-100 μm.

12. The method of claim 1, wherein the micron-size lithium metal phosphate composite has a particle size distribution characterized with a median size that is in a range of about 1-100 μm, and a standard deviation that is no more than 50% of the median size.

13. The method of claim 1, wherein the lithium metal phosphate nanoparticle has a size less than about 1.0 μm.

14. The method of claim 13, wherein the lithium metal phosphate nanoparticles have a size distribution characterized with a median size that is less than 1.0 μm, and a standard deviation that is no more than 50% of the median size.

* * * * *